United States Patent

Lindroth

[19]

[11] Patent Number: 5,966,668

[45] Date of Patent: *Oct. 12, 1999

[54] METHODS FOR HANDLING RECONFIGURATION OF RADIO BASE STATIONS IN RADIO LOCAL LOOP SYSTEMS

[75] Inventor: Lars Magnus Lindroth, Stockholm, Sweden

[73] Assignee: Telefonaktiebolaget LM Ericsson, Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/522,708

[22] Filed: Sep. 1, 1995

[51] Int. Cl.$^6$ ........................................ H04Q 7/26

[52] U.S. Cl. .................. 455/555; 455/446; 455/514; 455/525

[58] Field of Search ................... 455/33.1, 54.1, 455/54.2, 34.1, 62, 63, 56.1, 446, 554, 555, 524, 525, 514; 379/58, 59

[56] References Cited

U.S. PATENT DOCUMENTS

| | | | |
|---|---|---|---|
| 5,265,150 | 11/1993 | Helmkamp et al. | 455/555 |
| 5,422,930 | 6/1995 | McDonald et al. | 379/58 |
| 5,428,668 | 6/1995 | Dent et al. | 455/33.1 |
| 5,475,735 | 12/1995 | Williams et al. | 339/59 |
| 5,584,049 | 12/1996 | Weaver, Jr. et al. | 455/56.1 |

FOREIGN PATENT DOCUMENTS 2261575  5/1993  United Kingdom.

*Primary Examiner*—Edward F. Urban
*Attorney, Agent, or Firm*—Burns, Doane, Swecker & Mathis, L.L.P.

[57] ABSTRACT

Techniques for enhancing radiocommunication systems, e.g., radio local loop systems, are described. Radio local loop systems replace a portion of the wired connections between a local exchange and, for example, a telephone set, with a wireless connection. Like conventional wired systems, remote unit mobility is limited. However, the present invention supports system reconfigurations, such as cell splitting, in a manner which obviates the conventional necessity of reprogramming each remote unit in a radio local loop system. Backup cells can also be provided to enhance system reliability.

14 Claims, 4 Drawing Sheets

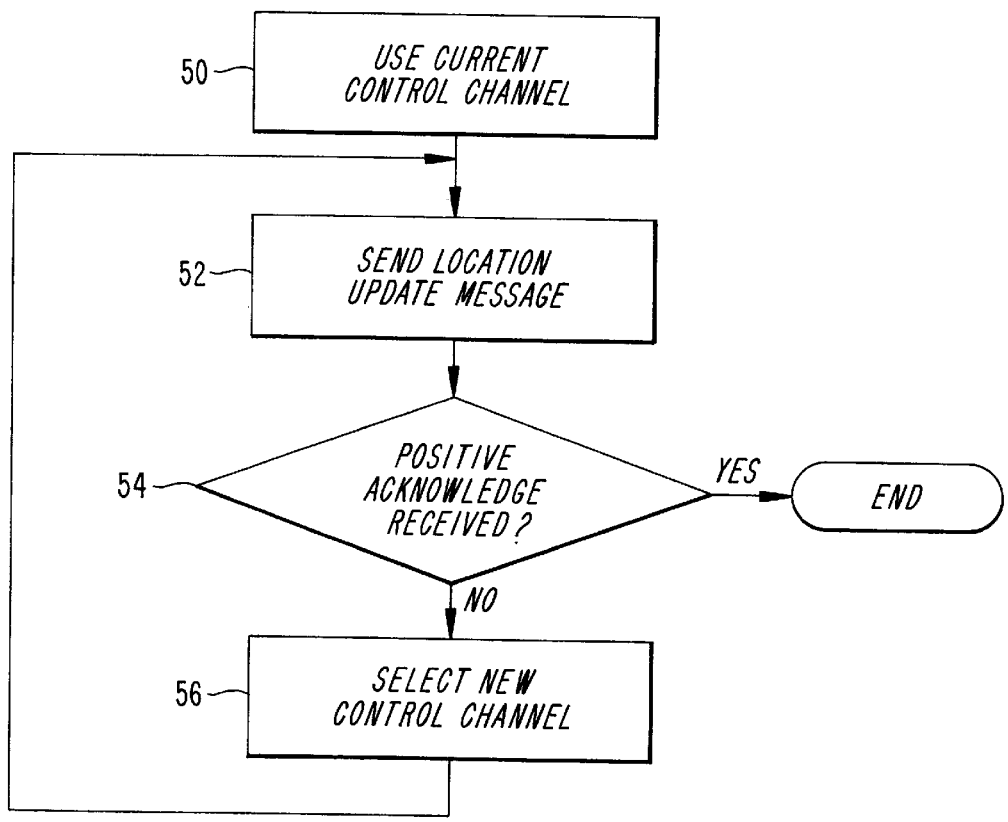

METHODS FOR HANDLING RECONFIGURATION OF RADIO BASE STATIONS IN RADIO LOCAL LOOP SYSTEMS

BACKGROUND

The present invention generally relates to radio local loop communication systems and, more particularly, to cell splitting in such systems.

The radiocommunication industry has made phenomenal strides in commercial operations in the more heavily industrialized countries as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Cellular radiocommunication systems have provided a large portion of this growth due to, for example, their ability to support mobile communications. However, cellular systems comprise only a portion of the radiocommunication universe. Another type of radiocommunication system is commonly known as a radio local loop (RLL) or wireless local loop (WLL) system. In RLL systems, shared radio connections replace, at least partially, the more conventional wire connections between remote units (e.g., telephone sets) and the local exchange. To implement these radio connections, subscriber radio terminals (SRTs) support a subscriber end of the radio link (e.g., connected to a standard telephone set) and radio base stations (RBSs) are connected to the local exchange. The air interface between RBSs and SRTs can be implemented using any known cellular technology, for example, NMT, GSM, TACS, D-AMPS, etc. By replacing wire connections with radio connections, system installation can be performed quickly and cheaply, particularly at rural sites where distances between subscribers and local exchanges make running copper wire prohibitively expensive or high density areas where wiring complexity increases costs.

Like many popular innovations, radiocommunication systems could be described as victims of their own success in the sense that demand for wireless services threatens to exceed the capacity of installed systems' in certain areas. One solution used in cellular systems to expand capacity is known as cell splitting. By reusing the same frequency or group of frequencies in only cells which are a certain minimum distance apart, the interference contributed to signals within those cells from the so-called co-channel cells is reduced to a level which provides acceptable receive signal quality. Thus, in many cellular systems frequency reuse patterns have been adopted to provide geographical restraints on the reuse of frequencies to limit co-channel interference. However, frequency reuse patterns also limit capacity in radiocommunication systems which are allocated only a finite bandwidth within the radio frequency spectrum. Thus, cell splitting, i.e., dividing a cell into several smaller cells that use different groups of frequencies for communication, increases overall system capacity by increasing frequency reuse. Note that this allows the co-channel interference ratio to remain the same.

In cellular systems, each cell is associated with at least one control channel which supports various overhead functions including paging and access to the system. In cellular systems, the selection of a particular base station as a serving base station for a particular mobile station can be made based upon, for example, the strength at which the mobile station receives each base station's control channel. When a cell split occurs in a cellular system, each newly created cell will have its own control channel associated therewith. In this way, mobile stations can quickly adapt to the change in system structure by listening to the new control channels as well as those which existed before the cell split. Accordingly, a cellular system's adaptation to cell splitting is relatively uncomplicated, at least from the mobile station's point of view.

Like cellular systems, many RLL systems require post-installation expansion to handle additional subscribers. Unfortunately the cell splitting technique used in cellular systems is not readily adaptable to RLL systems. One reason is that cell splitting was designed for systems which support subscriber mobility, but RLL systems are designed to support subscriber units which have limited mobility due to, for example, regulatory reasons and physical system limitations of local exchanges. For example, while cellular systems provide subscriber registers on the trunk side of the exchange which allows calls to be routed to other exchanges as necessary, existing RLL systems use subscriber line registers which are disposed in the switch interface module (SIM), which interfaces the RBSs with the local exchange. Since the SIM is disposed on the subscriber's side of the local exchange, access to the subscriber line registers is localized and routing calls to other local exchanges or SIMs is not possible. To prevent SRTs from attempting to access restricted RBSs, each SRT is manually programmed with a code identifying the cell or cells which it may access. When cell splitting occurs in RLL systems, new cells are created and thus SRTs may be restricted to a new RBS or group of RBSs. This requires manually reprogramming each affected SRT with a new code. In addition to cellsplitting, other network reconfigurations may also occur which necessitate reprogramming of SRTs. However, manual reprogramming of SRTs may take, for example, several hours per subscriber thus making changes in the RLL network virtually impossible for practical and economical reasons.

Another drawback to conventional RLL systems is that since each SRT is restricted to, for example, a single cell with which it can communicate, there are frequently periods during which an SRT will be unable to provide a connection. For example, an SRT may lose contact with its cell due to certain weather conditions or if an object is moved into a position which completely blocks the SRT from radio communication with its assigned RBS. Another example would be if the RBS is temporarily out of service for maintenance or system reconfiguration purposes.

SUMMARY

These and other drawbacks and limitations of conventional RLL systems are overcome according to the present invention which provides, for example, techniques by which manual reprogramming of SRTs upon system reconfiguration is avoided. According to one exemplary embodiment, new control channel assignments are controlled by the system and learned by the SRTs upon system reconfiguration. The SRTs invoke a location update procedure upon detecting that a system reconfiguration, e.g., cell splitting, has occurred. The system provides an indication as to which new control channel that the SRT is to lock onto and the SRT adapts to the new assignment.

According to another exemplary embodiment of the present invention, the cell or group of cells to which an SRT is restricted in its communication may be changed by sending a signal from the system which forces the SRT to changeover to a new cell (i.e., a new control channel). The SRT then attempts to communicate with the new cell and, if the attempt is successful and verified as correct, the SRT stores the identity of the new cell as that to which it is currently restricted.

According to yet another embodiment, a list of cells (or control channels) to which an SRT may be assigned upon system reconfiguration is stored in the SRT along with the SRT's current cell assignment. The SRT will then attempt to locate a control channel indicated by this list in an order beginning with a system reconfiguration predicted to occur furthest in the future, e.g., the nth cell split where 1 to n cell splits are predicted, and ending with the SRT's current assignment. Thus, when reconfiguration occurs, the SRT will then detect a higher ranked cell (i.e., its newly assigned cell) and lock onto the new control channel.

BRIEF DESCRIPTION OF THE DRAWINGS

The foregoing and other, objects, features and advantages of the present invention will be more readily understood upon reading the following detailed description in conjunction with the drawings in which:

FIG. 4 is an exemplary table which stores associations between SRTs and cells according to an exemplary embodiment of the present invention;

FIG. 5 is a flow chart illustrating signalling by an SRT according to an exemplary embodiment of the present invention;

DETAILED DESCRIPTION

The following exemplary embodiments describe the present invention in terms of RLL systems. However, those skilled in the art will appreciate that the present invention can also be applied to other types of systems, e.g., fixed cellular systems. Similarly, cellsplitting is one technique which results in system reconfiguration. However, the present invention is also applicable to any and all types of system reconfiguration.

In an RLL system, a group of fixed public switched telephone network (PSTN) subscribers located in a defined geographical area, e.g., 1 to 100 kilometers in diameter, share connections each comprising, for example, a wire-bound segment and a radio-bound segment in series. Alternately, some of the connections can be purely wire-bound or purely radio-bound while some of the connections are hybrids.

Figure 1:
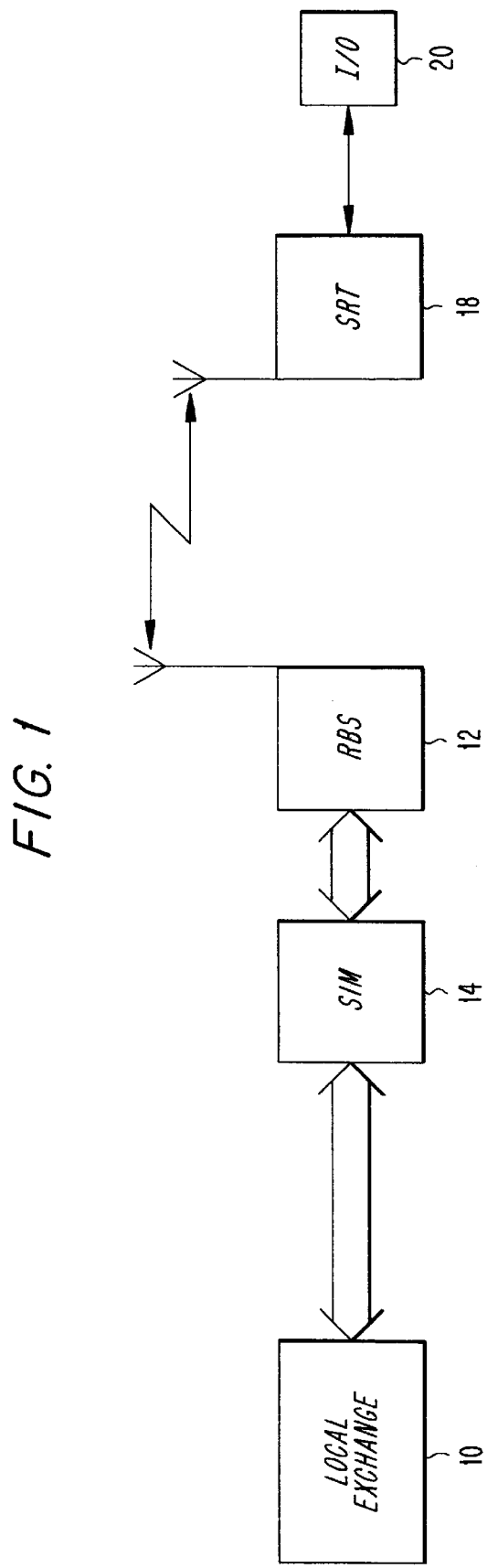
FIG. 1 is a block diagram of an exemplary RLL system.

FIG. 1 illustrates an exemplary way in which these hybrid connections can be implemented. A local exchange 10 is connected to a radio base station (RBS) 12 through a switch interface module (SIM) 14. The local exchange 10 and the SIM 14 can be co-located. The RBS 12 can, for example, support radio channels using any conventional radio communication access methodology, e.g., FDMA, TDMA or CDMA.

In FIG. 1, a subscriber radio terminal (SRT) 18 for receiving signals transmitted over a radio channel from the RBS 12, is shown as being connected to an I/O device 20 (e.g., a telephone or a fax machine). An adaptor (not shown), if necessary, can provide an interface between a four wire output port of the SRT 18 and a two wire input port of the I/O device 20 for speech or data which can be then connected to a telephone or a fax terminal. Alternatively, the SRT 18 and I/O device 20 can be manufactured as a single unit. The SIM 14 administrates the access authorization procedure, e.g., coordinating the transmission of location update acknowledgement signals as described below. Those skilled in the art will appreciate that FIG. 1 is a simplification of an actual RLL system. For example, although only one SRT 18 (and associated I/O device 20) is illustrated, each RBS 12 will typically support many SRTs. Similarly, each SIM 14 may support more than one RBS 12.

Figure 2:
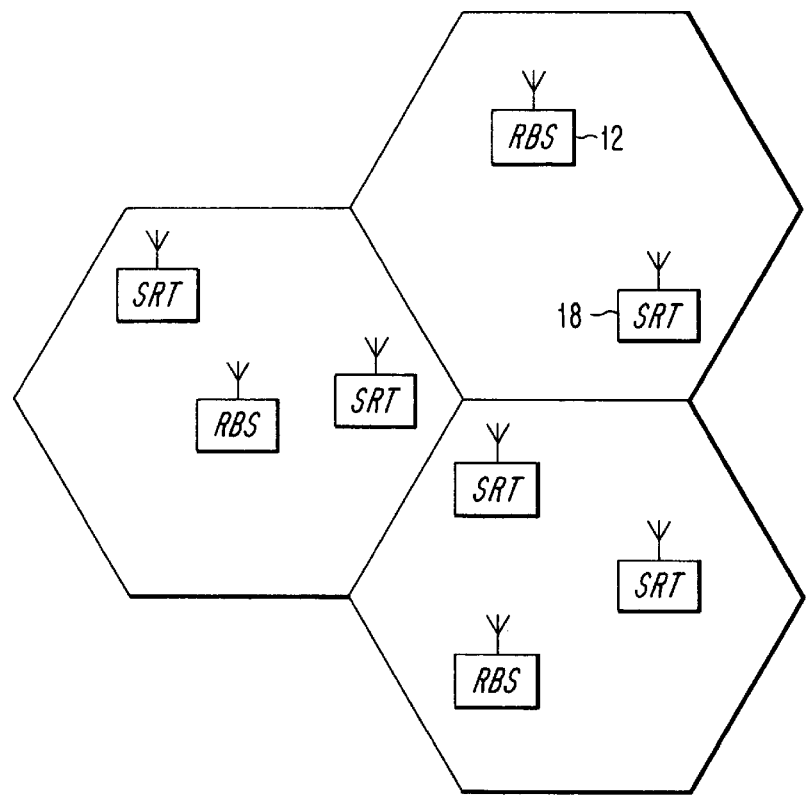
FIG. 2 is an illustration of a group of RBSs and SRTs grouped by cell.

FIG. 2 illustrates a geographical layout of RBSs and SRTs including RBS 12 and SRT 18 of FIG. 1. The cell boundaries are illustrated therein as hexagons for ease of illustration, although those skilled in the art will understand that cell boundaries typically do not assume such a regular shape due to, for example, obstructions which block radio transmissions. To convey the advantages of RLL systems according to the present invention, consider first the operation of the RLL system of FIG. 2 according to conventional principles.

Each of the RBSs in FIG. 2, including RBS 12, continuously broadcast a control channel (also known as a paging channel) which supplies, for example, overhead information to the SRTs and provides a mechanism for initiating a connection between an I/O unit 20 and the local exchange 10. When SRT 18 is, for example, turned on, it will evaluate control channels until it identifies a control channel that it is permitted to access. This evaluation process is performed by comparing cell identity codes, e.g., digital color codes, transmitted as one of the fields on each control channel with a code stored in the SRT 18. Each cell or group of cells will have its own unique code so that the SRTs are restricted as to which cell or cells they may access. In this example, SRT 18 will look for the code associated with RBS 12 and will then lock onto (sometimes referred to as "camping on") that control channel and listen for messages containing its ID.

Figure 3:
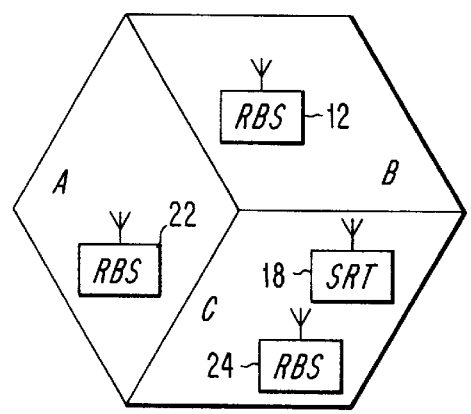
FIG. 3 is an illustration of one of the cells of FIG. 2 split into three cells.

Now suppose that the system operator for the RLL system of FIG. 2 has decided to expand the number of SRTs which can be supported by splitting each cell into three new cells. Thus, for example, the cell containing RBS 12 and SRT 18 might be divided into cells A, B and C as seen in FIG. 3. New RBSs 22 and 24 are added to cells A and C, respectively. Since SRT 18 is now located in cell C and, typically, would desirably be restricted to accessing RBS 24, the code stored in SRT 18 must be reprogrammed to correspond to the cell identity code which is transmitted over the control channel associated with RBS 24. In fact, many other SRTs would likely have to be reprogrammed in this manner when a system operator decides to split cells in an RLL system.

According to exemplary embodiments of the present invention, manual reprogramming of SRTs can be avoided by, for example, allowing the SRTs to switch control channels under circumstances which are controlled by the system. In this way, the restricted mobility feature of RLL systems is preserved (i.e., an SRT does not decide itself which cell or control channel it will listen to), but the system operator has the capability to quickly and easily adapt the SRTs to changes, such as those caused by cell splitting.

It is worth noting that this solution is very different from the way in which control channels are assigned to mobile stations in cellular radio systems. In cellular systems, it is the mobile station which selects a control channel based upon, for example, the received signal strength of each of several control channels broadcast from base stations in nearby cells. As mentioned earlier, this approach is not feasible for RLL systems which have been designed around the feature of limited SRT mobility and, therefore, provide a subscriber register in each SIM to purposefully limit mobility.

According to a first exemplary embodiment of the present invention, each SRT is restricted to communicating with a designated cell or group of cells, but the designation can be changed by the system over the air interface. Consider again the example provided in FIGS. 1—3. SRT 18 is initialized with instructions to listen to the control channel associated with RBS 12, e.g., by way of a stored cell identity code, when the system is configured as shown in FIG. 2. The system operator then performs a system reconfiguration, e.g., a cell split which results in the configuration of FIG. 3. As one step in performing the cell split, a table in SIM 14 is updated with information as to which RBS each SRT should connect to in the new system configuration. For example, FIG. 4 depicts a table which shows that SRT 18 should connect with cell C (i.e., RBS 24) after the cell split has occurred. The SRT 18 will recognize that a system reconfiguration, e.g., a cell split, has occurred using, for example, one or more of the exemplary techniques described below.

This first exemplary embodiment will now be described with respect to FIG. 5. SRT 18 then will attempt to locate a control channel having a cell identity matching its stored cell identity, in this example the cell identity of RBS 12 at block 50. If RBS 12 has not been reconfigured to transmit a new cell identity, SRT 18 will identify RBS 12 and transmit a location update message thereto including an identification which uniquely identifies SRT 18 at block 52. The SIM 14 evaluates location update messages to determine if the RBS which received the location update message corresponds to the cell(s) to which the SRT identified in the location update message is restricted based upon, for example, the table stored in the SIM. In this example, the network will recognize that SRT 18 is currently assigned to cell C by reviewing the table stored in SIM 14. Since SRT 18 is not supposed to camp on the control channel of RBS 12 any longer, the network will forward a negative acknowledgement to RBS 12 for transmission on its control channel.

Upon reception of the negative acknowledgement at block 54, SRT 18 will then select another control channel associated with another cell for transmitting another location update message at block 56. The negative acknowledgement signal may include information by which the SRT 18 can quickly locate the control channel to which it has been reassigned, e.g., one or more of cell identity, control channel frequency and SIM identity. If this information is present in the negative acknowledgement signal, then SRT 18 can directly tune to the correct control channel. Otherwise, SRT 18 will continue to select control channels and send location update messages until a positive acknowledgement is received, i.e., in this example until SRT 18 forwards a location update message via RBS 24 of cell C. The SRT 18 can select control channels for location update in a variety of ways that will be apparent to those skilled in the art. For example, SRT 18 can select control channels in order of their received signal strength, i.e., greatest to weakest, since it is expected that an assigned control channel would be received by the SRT with a relatively high signal strength. This procedure can also be used to transmit the initial location update message if the SRT is unable to locate its originally assigned control channel.

As mentioned earlier, in order to begin the location update process an SRT must first recognize that a cell split (or other system reconfiguration) has occurred. This recognition by the SRT can be implemented in a number of different ways. For example, if an SRT does not detect the control channel of the cell to which it has been assigned, this can be interpreted by the SRT as an indication that a cell split has occurred. The SRT will then select another control channel, possibly based upon received signal strength, to perform location updating as described above. The network response may be either a positive or negative acknowledgement and can also include an indication of whether or not a cell split has occurred. If a cell split has occurred, then the process would continue as described above whereby the SRT would either receive the information needed to tune to its newly assigned control channel or continue to search for the correct cell. If a cell split has not occurred, then the SRT's inability to locate its assigned control channel is due to some other occurrence, for example a structure which completely blocks the radio path between the SRT and the RBS of its assigned cell.

This failure to receive an assigned control channel can be overcome according to another exemplary embodiment of the present invention wherein an SRT may be assigned to one cell during normal operation, but may also be allowed to temporarily connect to one or more backup cells when the control channel of the assigned cell cannot be located and a cell split has not occurred. The identities of the one or more backup cells may be programmed into the SRT along with the identity of its assigned cell when the SRT is placed into operation and can be updated over the air interface, e.g., by transmitting a list of backup cells with a positive location update acknowledgement when a cell split occurs. Thus, the information as to the assignment of backup cells can also be placed in the tables stored in SIMs 14, e.g., that of FIG. 4. The network can maintain a statistical function to detect SRTs that frequently use backup cells so that the system operator can investigate whether system reconfiguration or some other type of remedial action is needed. For example, frequent use of the backup cells can be caused by poor radio coverage or by unauthorized mobility of the SRT.

Other techniques can also be implemented to provide SRTs with the capability to recognize when a cell split has occurred. Information can be broadcast by each RBS over its control channel(s) to indicate if a cell split has occurred. For example, a one bit field can be provided which, when toggled, provides an indication to listening SRTs that a cell split has occurred. Another way for an SRT to determine if a cell split has occurred is to program the SRTs to periodically send a location update message to their assigned cell. The network response, i.e., a positive or negative acknowledgement, can be used by the SRT as an indication of whether a cell split occurred.

These various techniques for SRT recognition of a cell split can be provided to RLL systems either individually or in combination. For example, each of these techniques can be used in parallel to rapidly change the SRT assignments. Moreover, it is contemplated that in the wake of a cell split, many SRTs will attempt to send a location update message to the network. To avoid congestion or overloading of the system, the SRTs can be programmed to delay sending the location update message for a random time period to more evenly distribute location update signalling. This random time period could be generated, for example, by each SRT internally using a pseudorandom number generator (not shown). Limits on the random time period can be provided by prestoring such limits in each SRT, or by broadcasting the random time period limits to all SRTs. Of course, should a subscriber attempt to connect to the system during the random period that the SRT is waiting to perform location updating, this attempt would override the normal delay and the SRT would then immediately perform location updating and provide a connection for the subscriber.

Figure 6:
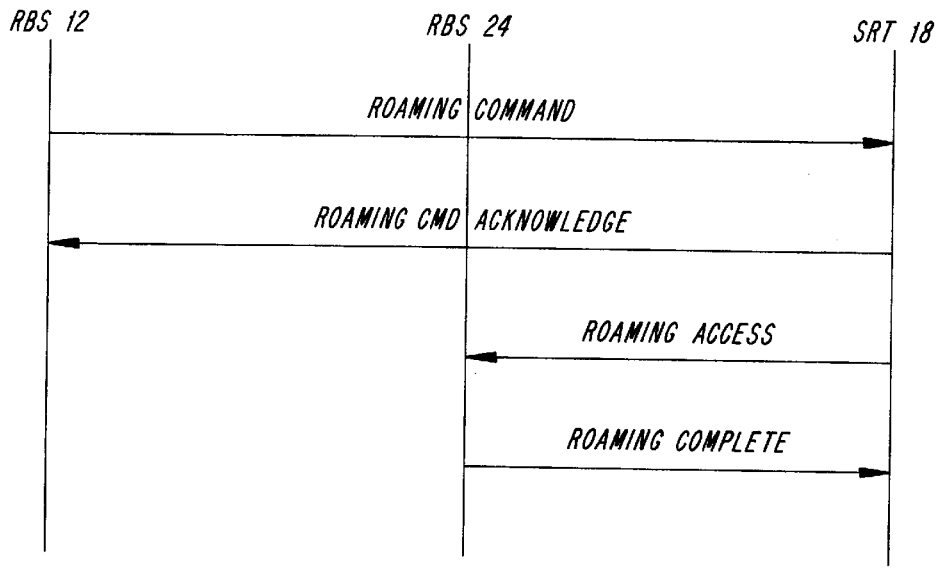
FIG. 6 illustrates signalling between various RBSs and an SRT according to an exemplary embodiment of the present invention.

According to another exemplary embodiment of the present invention, the network takes a more active role in switching the control channel assignments of SRTs after a cell split is performed by a system operator. This is accomplished by sending a message from the network to each SRT that is being reassigned to a new cell indicating the identity of the new cell without waiting. An exemplary process for performing this signalling is shown in FIG. 6, for the changeover described above wherein SRT 18 is reassigned from RBS 12 to RBS 24 (e.g., as shown in FIG. 3).

First, a roaming command message is transmitted from RBS 12 to SRT 18. This message includes the cell identity, for example a color code, of the new cell, in this case cell C including RBS 24. SRT 18 then acknowledges the receipt of the message by transmitting a roaming command acknowledge signal back to the network via RBS 12. Next, SRT 18 tunes to the control channel associated with RBS 24 and transmits a roaming access message containing its SRT identity to RBS 24. The network verifies that SRT 18 is permitted to be connected to cell C and then sends a roaming complete message to SRT 18. The network also updates its routing information so that incoming calls for SRT 18 can be directed to the cell C. When receiving the roaming complete message, SRT 18 updates its stored information regarding the cell to which it is assigned.

Figure 7:
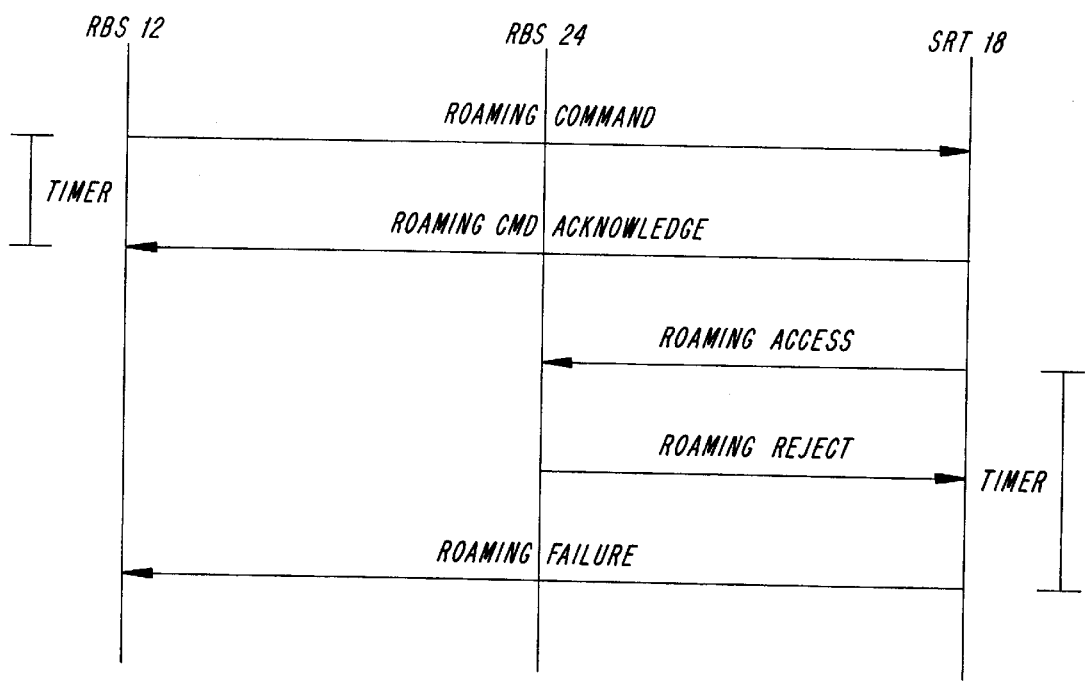
FIG. 7 also illustrates signalling between various RBSs and an SRT according to an exemplary embodiment of the present invention.

Of course a number of errors can occur during the type of signalling illustrated in FIG. 4, for which error handling techniques can be provided. For example, if the network doesn't receive the roaming command acknowledge message within a certain period of time after the roaming command message is transmitted, then the roaming command message will be retransmitted. As generally indicated in FIG. 7, this period can be tracked by a timer in the SIM or RBS. Similarly, if the SRT does not receive the roaming complete message from the network within a certain period of time after it has transmitted the roaming access message, or if the network sends a roaming reject message as shown in FIG. 7, then the SRT will return to its original cell. A roaming failure message is then sent to the network. Alternatively, the SRT can repeat the roaming access message one or more times after expiration of the timer in each SRT which tracks the time expired after the transmission of a roaming access message.

Forced roaming according to this exemplary embodiment of the present invention can be initiated when SRTs are to be reassigned, for example, by way of a terminal device (not shown) connected to the SIM. As will be appreciated by those skilled in the art, reassigning a multitude of SRTs remotely using such a terminal will take substantially less time than manually reprogramming each individual SRT to be reassigned.

According to yet another exemplary embodiment of the present invention, the SRTs can each be preprogrammed with information about predicted system reconfigurations at the time it is placed into service. For example, each SRT can have stored therein a list of cells and their respective connect priority, wherein the list is created based upon envisioned cell splitting. Thus, if the system operator envisions expansion requiring two, sequential cell splitting operations, three cell identities can be stored in each SRT. Specifically, the identity of a currently assigned cell, the identity of a cell envisioned to include that SRT after a first cell split and, the identity of a cell envisioned to include that SRT after a second cell split. These cell identities can be prioritized in the order described (lowest to highest) so that the SRT will automatically listen to the correct cell even after a cell split has occurred. The SRT will then restrict its communications to the highest priority cell for which it can locate a control channel. Referring again to the hypothetical cell layout depicted in FIGS. 2 and 3, another example will now be described with respect to this exemplary embodiment.

Suppose that FIG. 2 illustrates the cell configuration of an RLL system when it is initially placed into service (of course many additional SRTs would also be present in each cell). Since the SRTs are designed to have restricted mobility, and given knowledge of the geographical way in which each cell is likely to be split in the future, a system designer can predict which cell each SRT is likely to be reassigned to after a cell split occurs. For example, if a system designer knows that each cell is likely to be split three ways in the manner shown in FIG. 3, then it can readily be determined that SRT 18 will be reassigned to cell C after a first cell splitting operation. Similarly, one could further predict in which third of cell C that SRT 18 would be located if another cell split was performed.

Given this knowledge, SRT 18 can be preprogrammed with a list of candidate cell identities (or control channel frequencies if known) which SRT 18 will use when determining which cell or control channel to attempt to lock onto. Using the previous example, SRT 18 could be programmed with the cell identities of both the cell of FIG. 2 containing both RBS 12 and SRT 18 and that of cell C of FIG. 3. As mentioned above, the list of cell identities can be prioritized so that the SRT locks onto the correct cell regardless of whether a cell split has occurred. For this example, the identity of cell C can be given the higher priority than that of the original cell of FIG. 2 in the list stored in SRT 18 so that SRT 18 will first attempt to lock onto the control channel of cell C and, if unsuccessful because a cell split has not yet occurred, it will then attempt to lock onto the channel associated with the original cell in FIG. 2.

This process presumes that, prior to a cell split, SRT 18 will not be able to locate the channel associated with cell C. If necessary (e.g., due to a tight frequency reuse plan), however, a hysteresis factor can be added to the determination of whether or not a control channel exists with respect to a certain SRT. For example, one would expect that if the system was configured as shown in FIG. 3 that the control channel transmitted by RBS 24 would be received relatively strongly by SRT 18. Thus, a hysteresis factor could be provided such that SRT 18 would lock onto the control channel of cell C only if it was received with a strength sufficient to eliminate the possibility that a more distant cell using the same control channel frequency was not being received instead.

Those skilled in the art will recognize the many benefits associated with the application of the inventive techniques to RLL systems. For example, the amount of effort needed to reconfigure the SRTs after a cell split will be dramatically reduced. Moreover, the provision of backup cells will make RLL service more reliable since the sensitivity to radio disturbance is reduced. By allowing certain SRTs, e.g., those belonging to priority subscribers, to connect to a greater number of cells, the operator can provide different levels of service.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What I claim is:

1. A method for reconfiguring a radiocommunication system having a local exchange connected to a remote unit via a wireless connection supported by a radio terminal having limited mobility, said method comprising the steps of:

restricting said radio terminal having limited mobility to a first cell with which said radio terminal may communicate;

splitting said first cell into a plurality of cells, such that said radio terminal is subsequently located within a second cell;

reassigning, in response to said splitting step, said radio terminal from said first cell to said second cell, such that said radio terminal is then restricted to communicate with said second cell; and broadcasting an indication of said second cell's identity to said radio terminal.

2. The method of claim 1, wherein said step of reassigning said radio terminal further comprises the step of:

updating a table in said system which identifies a correspondence between radio terminals and cells to which said radio terminals are restricted.

3. The method of claim 1, wherein said step of broadcasting further comprises the step of:

receiving, at a radio base station, a location update message from said radio terminal; and transmitting, from said radio base station, an acknowledgement message to said radio terminal in response to said location update message.

4. The method of claim 3, wherein said step of transmitting further comprises the step of:

transmitting a positive acknowledgement message if said radio base station is associated with said second cell.

5. The method of claim 3, wherein said step of transmitting further comprises the step of:

transmitting a negative acknowledgement message if said radio base station is associated with a cell other than said second cell.

6. The method of claim 5, wherein said negative acknowledgement message includes information which identifies one of said second cell and a control channel associated with said second cell.

7. The method of claim 1, further comprising the step of:

providing at least one backup cell to which said radio terminal is permitted access when said radio terminal cannot locate a control channel associated with the first cell.

8. The method of claim 1, wherein said step of broadcasting further comprises the step of:

broadcasting a roaming message from said first cell to said radio terminal instructing said radio terminal to restrict access to said second cell instead of said first cell.

9. The method of claim 8, further comprising the steps of:

transmitting, by said radio terminal, a roaming access message to said second cell using the identity of said second cell provided in said roaming message;

verifying, by said radiocommunication system, a correspondence between said radio terminal and said second cell upon receipt of said roaming access message; and transmitting, from said second cell to said radio terminal, one of a roaming complete message and a roaming reject message based upon a result of said verifying step.

10. A method for reconfiguring a radiocommunication system having a local exchange connected to a remote unit via a wireless connection supported by a radio terminal, said method comprising the steps of:

restricting said radio terminal to a first cell with which said radio terminal may communicate;

reconfiguring said radiocommunication system such that said radio terminal is within a second cell;

reassigning said radio terminal from said first cell to said second cell, such that said radio terminal is then restricted to communicate with said second cell;

broadcasting an indication of said second cell's identity to said radio terminal and broadcasting a roaming message from said first cell to said radio terminal instructing said radio terminal to restrict access to said second cell instead of said first cell;

transmitting, by said radio terminal, a roaming access message to said second cell using the identity of said second cell provided in said roaming message;

verifying, by said radiocommunication system, a correspondence between said radio terminal and said second cell upon receipt of said roaming access message; and transmitting, from said second cell to said radio terminal, one of a roaming complete message and a roaming reject message based upon a result of said verifying step.

11. A method for reconfiguring a radiocommunication system having a local exchange connected to a remote unit via a wireless connection supported by a radio terminal having limited mobility, said method comprising the steps of:

restricting said radio terminal having limited mobility to a first base station with which said radio terminal may communicate;

adding a second base station to said radiocommunication system;

reassigning, in response to said adding step, said radio terminal from said first base station to said second base station, such that said radio terminal is then restricted to communicate with said second base station; and providing an indication of said second base station's identity to said radio terminal.

12. The method of claim 11, wherein said step of providing further comprises:

broadcasting said indication of said second base station's identity.

13. The method of claim 11, wherein said step of providing further comprises:

retrieving, from a memory device within said terminal, an identity of said second base station.

14. The method of claim 1, wherein said radio terminal having limited mobility is substantially fixed geographically.

* * * * *